US009677457B2

(12) United States Patent
Brendel et al.

(10) Patent No.: US 9,677,457 B2
(45) Date of Patent: Jun. 13, 2017

(54) VEHICLE HAVING A COMPONENT COOLED BY MEANS OF A COOLING AIR MASS FLOW

(75) Inventors: Thomas Brendel, Mettmann (DE); Frank Elsenheimer, Bochum (DE); Arnd Rueter, Krefeld (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 643 days.

(21) Appl. No.: 13/876,394

(22) PCT Filed: Sep. 22, 2011

(86) PCT No.: PCT/EP2011/066487
§ 371 (c)(1),
(2), (4) Date: Mar. 27, 2013

(87) PCT Pub. No.: WO2012/041758
PCT Pub. Date: Apr. 5, 2012

(65) Prior Publication Data
US 2013/0180479 A1    Jul. 18, 2013

(30) Foreign Application Priority Data
Sep. 27, 2010   (DE) .......................... 10 2010 041 440

(51) Int. Cl.
*B60H 1/32*        (2006.01)
*F01P 7/02*        (2006.01)
(Continued)

(52) U.S. Cl.
CPC ................ *F01P 7/02* (2013.01); *B61C 17/04* (2013.01); *B61D 27/0072* (2013.01); *Y02T 30/42* (2013.01)

(58) Field of Classification Search
CPC ......... B61C 17/04; B61D 27/0072; F01P 7/02
(Continued)

(56) References Cited

U.S. PATENT DOCUMENTS 1,330,081 A  *  2/1920  Ljungstrom .............. F28B 7/00
                                                        105/38
2,170,742 A  *  8/1939  Yingling ................... B61C 9/24
                                                       105/172
(Continued)

FOREIGN PATENT DOCUMENTS

DE           1180194 B       10/1964
DE            231671 A1       1/1986
(Continued)

*Primary Examiner* — Henry Crenshaw
(74) *Attorney, Agent, or Firm* — Laurence Greenberg; Werner Stemer; Ralph Locher

(57) ABSTRACT

A vehicle has at least one component which is cooled by a cooling air mass flow delivered from a conveying device such as a fan or a spoiler. A nominal value is predetermined for the cooling air mass flow which, for an assumed maximum thermal loading of the component, cools adequately for operation of the component. A control device controls an intensity of the cooling air mass flow and dimensions it, taking into consideration thermal demands of the component at least in an upper driving speed range, such that a sum of a power consumption of the component, of the conveying device and of a portion of a traction power of the vehicle that is allotted to the delivery of the cooling air mass flow is smaller than a sum of the power consumption of the component, the conveying device and the portion that is allotted to the delivery of the cooling air mass flow at the predetermined nominal value thereof, of a traction power of the vehicle.

29 Claims, 2 Drawing Sheets

(51) Int. Cl.
  *F02M 37/00* (2006.01)
  *B61C 17/04* (2006.01)
  *B61D 27/00* (2006.01)

(58) Field of Classification Search
  USPC .............................. 123/41.11, 434; 62/133
  IPC ........................................................ F01P 7/02
  See application file for complete search history.

(56) References Cited

U.S. PATENT DOCUMENTS

| | | | | |
|---|---|---|---|---|
| 2,260,900 A | * | 10/1941 | Henney | B61D 27/0081 |
| | | | | 165/236 |
| 2,477,250 A | * | 7/1949 | Hinez | B61D 27/0027 |
| | | | | 414/343 |
| 2,572,008 A | * | 10/1951 | Cahusac | G08B 17/107 |
| | | | | 116/214 |
| 3,486,241 A | * | 12/1969 | Coyle | B61D 27/0027 |
| | | | | 105/247 |
| 3,515,051 A | * | 6/1970 | Pulcrano | B61D 5/04 |
| | | | | 105/247 |
| 3,862,604 A | * | 1/1975 | Pelabon | B61C 17/04 |
| | | | | 105/36 |
| 3,919,927 A | * | 11/1975 | Bernard, Jr. | B60H 1/262 |
| | | | | 454/104 |
| 4,867,499 A | * | 9/1989 | Stephan | B62D 35/001 |
| | | | | 296/180.1 |
| 5,376,550 A | * | 12/1994 | Fine | B07C 5/34 |
| | | | | 209/3.1 |
| 5,566,745 A | * | 10/1996 | Hill | B61C 5/02 |
| | | | | 105/62.2 |
| 5,813,600 A | * | 9/1998 | Straub | B60H 1/00864 |
| | | | | 165/204 |
| 5,909,099 A | * | 6/1999 | Watanabe | A61K 31/726 |
| | | | | 320/108 |
| 6,038,156 A | * | 3/2000 | Inam | H02M 7/003 |
| | | | | 257/718 |
| 6,339,933 B2 | | 1/2002 | Hamery et al. | |
| 6,430,951 B1 | * | 8/2002 | Iritani | B60H 1/00021 |
| | | | | 62/160 |
| 6,860,112 B1 | | 3/2005 | Kobayashi et al. | |
| 7,469,927 B1 | * | 12/2008 | Winner, Jr. | B60J 1/18 |
| | | | | 280/762 |
| 2001/0003904 A1 | * | 6/2001 | Hamery | B60H 1/00764 |
| | | | | 62/133 |
| 2001/0050025 A1 | | 12/2001 | Mary et al. | |
| 2005/0044868 A1 | | 3/2005 | Kobayashi et al. | |
| 2006/0086113 A1 | | 4/2006 | Errington et al. | |
| 2006/0144581 A1 | | 7/2006 | Kauf | |
| 2006/0174640 A1 | * | 8/2006 | Caskey | F25B 49/027 |
| | | | | 62/183 |
| 2007/0289570 A1 | * | 12/2007 | Knockl | B60K 11/06 |
| | | | | 123/198 E |
| 2008/0209929 A1 | * | 9/2008 | Helms | B60H 1/3208 |
| | | | | 62/228.1 |
| 2008/0244979 A1 | * | 10/2008 | Huang | E06B 7/096 |
| | | | | 49/82.1 |
| 2009/0057043 A1 | * | 3/2009 | Robinson | B60K 11/04 |
| | | | | 180/68.1 |
| 2009/0210096 A1 | * | 8/2009 | Stack | F24F 11/0009 |
| | | | | 700/278 |
| 2010/0006261 A1 | * | 1/2010 | Ishida | B61C 17/00 |
| | | | | 165/86 |
| 2011/0244776 A1 | | 10/2011 | Jordan | |

FOREIGN PATENT DOCUMENTS

| | | |
|---|---|---|
| DE | 19811719 A1 | 9/1999 |
| DE | 10132891 A1 | 1/2003 |
| DE | 102004053226 B3 | 2/2006 |
| DE | 60112504 T2 | 6/2006 |
| DE | 602004010973 T2 | 1/2009 |
| DE | 102008059886 A1 | 6/2010 |
| EP | 1112872 A1 | 7/2001 |
| EP | 1512601 A1 | 3/2005 |
| RU | 2372212 C1 | 11/2009 |

* cited by examiner

VEHICLE HAVING A COMPONENT COOLED BY MEANS OF A COOLING AIR MASS FLOW

BACKGROUND OF THE INVENTION

Field of the Invention

The invention relates to a vehicle having at least one component which, for cooling purposes, is impinged on by a cooling air mass flow conveyed with the aid of at least one conveying device such as a fan or spoiler, for which cooling air mass flow there is predetermined a nominal value which, for an assumed maximum thermal loading of the at least one component, provides a cooling action adequate for the operation thereof, and to a method for operating a vehicle of said type with regard to the cooling function.

In vehicles, generated heat to be dissipated is generally discharged to the ambient air with the aid of coolers. Such coolers are provided for example in the form of heat exchangers in the case of an air-conditioning system or else as cooling fins in the case of a traction converter of a rail vehicle. For cooling purposes, the ambient air which is inducted for example with the aid of the fan is conducted into or around the cooler and is dissipated to the environment again.

In the case of vehicles which are in motion, in particular also in the case of rail vehicles, an air mass flow, provided for cooling purposes, of the air taken in from the environment must be accelerated to a speed composed of a traveling speed and a throughflow speed or flow-around speed of the cooler. This leads, during traveling operation of the vehicle, to an additional traveling resistance, wherein a traction power to be imparted for the acceleration of the air mass flow rises quadratically with increasing traveling speed. In the case of components, provided with a cooler, of vehicles of all types, in particular buses, heavy goods vehicles and rail vehicles, a fan inducts air from the environment of the vehicle and conducts said air through or around the cooler. In a simplest case, it is possible for the cooler to be dispensed with, such that the component itself is impinged on directly by the cooling air flow.

The air mass flow generated by the fan generally cannot be regulated or controlled. Said air mass flow rather has a nominal value which, for an assumed maximum thermal loading of the component, provides a cooling action adequate for the operation thereof. In the case of such an approach, the required traction power rises significantly with increasing traveling speed, because the traveling resistance arising from the acceleration of the air mass flow must additionally be expended.

BRIEF SUMMARY OF THE INVENTION

Taking this as a starting point, it is the object of the invention to specify a vehicle and a method for the operation thereof, in which, during operation of the component in its admissible temperature range, the vehicle requires less power than in the prior art.

Said object is achieved with regard to the vehicle, in particular rail vehicle, in that a control device for controlling an intensity of the cooling air mass flow is provided and designed such that the cooling air mass flow is dimensioned, taking into consideration thermal demands of the component at least in an upper traveling speed range, such that a sum total of a power consumption of the at least one component, of the at least one conveying device and of a fraction of a traction power of the vehicle allotted to the conveying of the cooling air mass flow is lower than a sum total of the power consumption of the at least one component, of the at least one conveying device and of a fraction of a traction power of the vehicle allotted to the conveying of the cooling air mass flow with its predetermined nominal value. The fraction of a traction power of the vehicle allotted to the conveying of the cooling air mass flow with its predetermined nominal value may also be referred to as a fraction of a traction power of the vehicle generated by the conveying of the cooling air mass flow with its predetermined nominal value.

As a result of the mode of operation of the control device provided for controlling the cooling air mass flow, it is possible, in traveling operation, for the overall power demand of the vehicle to be lowered in relation to the prior art. This is because the sum total of the power consumptions of the component, of the fan and of the traction power additionally to be imparted for the acceleration of the cooling air mass flow during traveling is reduced.

This advantage brings about further advantages. For example, an installed traction power of the vehicle may be reduced, whereby production costs may also fall. The resulting lower required traction power may furthermore lead to a lower weight of the vehicle, which results in an even further reduced power demand.

The control device preferably acts on a rotational speed of at least one fan which is provided as a conveying device, such that for example by reducing said rotational speed, a lower cooling air mass flow is used for cooling the at least one component.

If a plurality of fans is used for conveying the cooling air mass flow, the control device can activate or deactivate at least one of the fans as required. Control of the cooling air mass flow is also effected by means of said measure.

In another embodiment of the invention, the control of the cooling air mass flow may also be effected by virtue of blades of the at least one fan being adjustable in terms of their angle of incidence, and the control device acting, in order to adjust the cooling air mass flow, on the angle of incidence of the blades.

A further alternative for the control of the cooling air mass flow may consist in a throttle flap being provided in the flow path for the cooling air mass flow, and the control device acting, in order to adjust the cooling air mass flow, on the throttle flap.

The vehicle may have a plurality of components to be cooled, wherein then the control device controls a respective magnitude of the cooling air mass flow for said plurality of components.

At least one operating variable of the vehicle selected from the group comprising traveling speed, a power consumption of the at least one component, a thermal loading of the at least one component, a power consumption of the at least one fan, an intensity of the cooling air mass flow, a rotational speed of the at least one fan and a traction power of the vehicle may be signaled to the control device. Said variables may be used individually, in groups or collectively in order to provide suitable measurement values for the control device such that the latter can control the cooling air mass flow in a power-saving manner.

If a plurality of fans is provided, it is preferably possible for a number of activated or deactivated fans to be signaled to the control device.

The total operating power required for the vehicle becomes particularly low if the control device is designed such that, taking into consideration thermal demands of the at least one component, the sum total of the power consumption of the at least one component, of the at least one fan and of the fraction of the traction power of the vehicle allotted to the conveying of the cooling air mass flow is minimized. Advantages of the invention are however also attained if the control device controls the cooling air mass flow such that it remains below its predetermined nominal value.

The control device may be designed such that the cooling air mass flow assumes its predetermined nominal value below a predetermined traveling speed. Since the power saving decreases with decreasing traveling speed of the vehicle, it may be expedient if, below the predetermined speed, no control of the cooling air mass flow is performed but rather instead the nominal value thereof is provided. At any rate, the cooling air mass flow should assume its nominal value when the vehicle is at a standstill because, in this operating state, the at least one component has its maximum efficiency.

The at least one component may be formed by an air-conditioning system which includes a condenser as a cooler. In this case, the control device controls the cooling air mass flow for the condenser. Alternatively or in addition, the at least one component may be formed by an electrical device, which is to be cooled, of the vehicle, which electrical device would then have at least one cooling structure as a cooler. The electrical device may be for example a converter or transformer. It is preferable for current measurement values for the cooling air mass flow or for a variable reflecting said cooling air mass flow to be signaled to the control device for regulation purposes, such that the control device operates as a regulating device. Said approach makes it possible for a cooling air mass flow considered to be expedient for a certain traveling speed to be more precisely adhered to.

To assist the conveying of the cooling air mass flow, aerodynamic elements may be provided on an intake opening and/or a discharge opening for the cooling air mass flow. This makes it possible for existing fans to be reduced, which may be realized for example through deactivation or downward regulation of individual fans.

The aerodynamic elements are preferably formed by guide flaps which are arranged one behind the other in the longitudinal direction of the vehicle. In this way, it is possible for the inflow and outflow of the cooling air mass flow to be targetedly influenced in an effective manner.

The guide flaps may, in relation to the vehicle, be mounted in each case so as to be pivotable about a transverse axis. This permits a fine adjustment of the position of the guide flaps for example with regard to a presently prevailing cooling air demand and the air resistance. It is for example possible for the position of the guide flaps to be pressure-regulated such that a back pressure for a fan is kept neutral. As a result of the adjustability of the guide flaps, it is furthermore possible for an opening to serve as an intake opening or as a discharge opening depending on the respective direction of travel of the vehicle. The guide flaps may then be positioned suitably for this purpose.

It may be advantageous for the intake opening and/or the discharge opening to be equipped with a guide grate for the cooling air mass flow. Said guide grate assists the intake or discharge of the cooling air mass flow at the respective opening. If a plurality of guide flaps are arranged one behind the other along the outer skin of the rail vehicle, it is possible, if appropriate, to dispense with the guide grate.

The object specified above is achieved, with regard to the method, by means of a method for operating a vehicle, in which at least one component is, for cooling purposes, impinged on by a cooling air mass flow conveyed with the aid of at least one conveying device, wherein an intensity of the cooling air mass flow is controlled such that the cooling air mass flow is dimensioned, taking into consideration thermal demands of the component at least in an upper traveling speed range, such that a sum total of a power consumption of the at least one component, of the at least one conveying device and of a fraction of a traction power of the vehicle allotted to the conveying of the cooling air mass flow is lower than a sum total of the power consumption of the at least one component, of the at least one conveying device and of a fraction of a traction power of the vehicle allotted to the conveying of the cooling air mass flow with its predetermined nominal value.

Preferred embodiments of the method will emerge from further patent claims.

The features of the method and the preferred embodiments thereof have already been explained above on the basis of the description of the vehicle.

BRIEF DESCRIPTION OF THE SEVERAL VIEWS OF THE DRAWING

Exemplary embodiments of the invention will be explained in more detail below on the basis of the drawing, in which.

DESCRIPTION OF THE INVENTION

Figure 1:
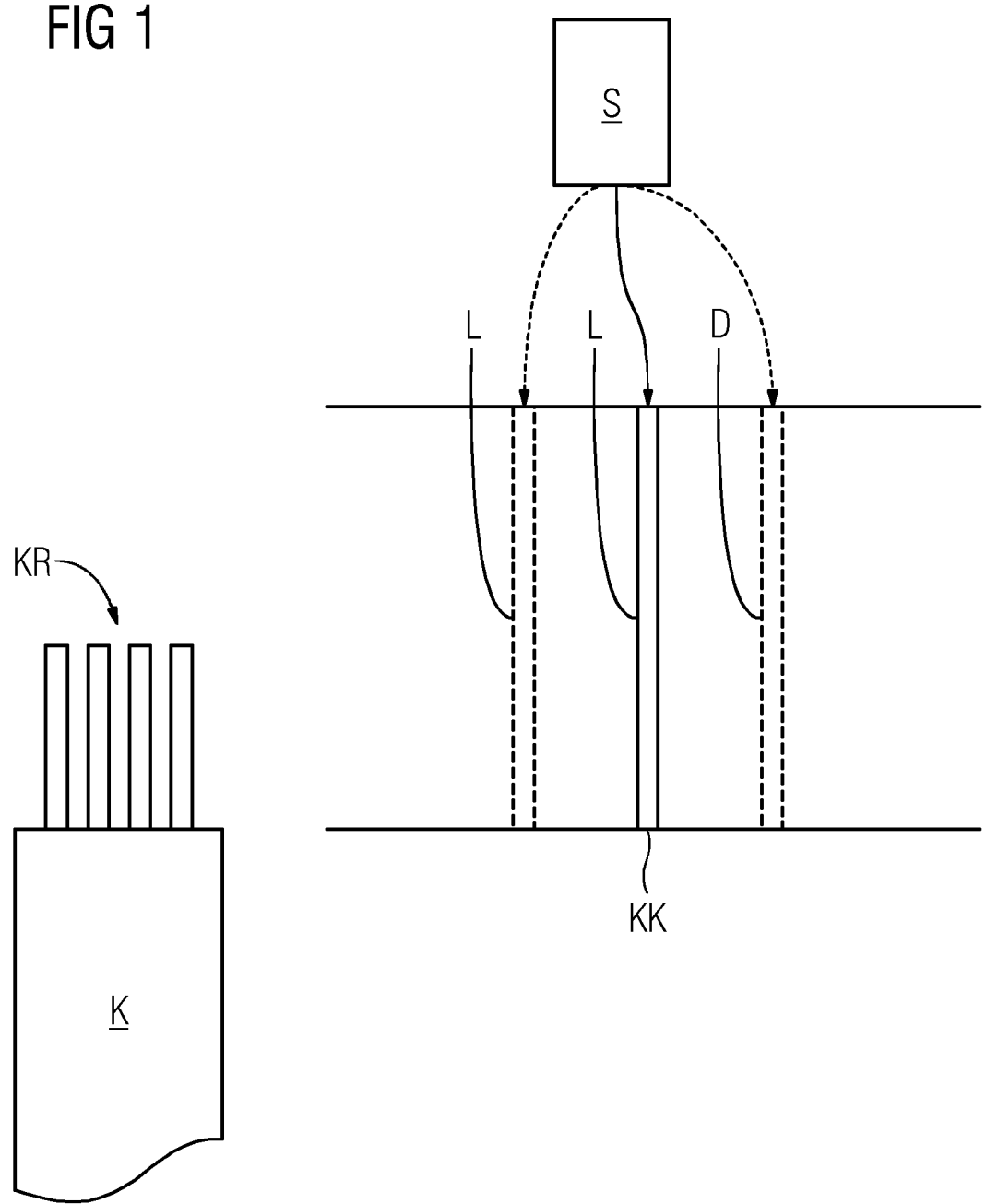
FIG. 1 is a schematic illustration of an arrangement, which serves for cooling purposes, within a rail vehicle.

FIG. 1 shows a component K, which is to be cooled, of a rail vehicle, which is described here representatively of vehicles of all types. The component K is equipped with a cooler KR which, for cooling purposes, is impinged on by air which originates from an air-conditioning duct KK and which is conveyed by a fan L. The impinging cooling air mass flow has the effect that, during the operation of the rail vehicle, the component K is kept below a temperature which ensures fault-free operation of the component K. For this purpose, a maximum admissible temperature value for the component K is stored in the control device S, which can control the cooling air mass flow in various ways.

The control device S is designed such that the cooling air mass flow is dimensioned, taking into consideration thermal demands of the component K at least in an upper traveling speed range, such that a sum total of a power consumption of the component K, of the fan L which conveys the cooling air mass flow and of a fraction of a traction power of the vehicle allotted to the conveying of the cooling air mass flow is lower than a sum total of the power consumptions of the component K and of the fan L and of a fraction of a traction power of the vehicle allotted to the conveying of the cooling air mass flow with a predetermined nominal value. Here, the predetermined nominal value for the cooling air mass flow signifies a flow which, for an assumed maximum thermal loading of the component K, provides a cooling action adequate for the operation thereof.

In the exemplary embodiment illustrated, the air-conditioning duct KK is equipped with the fan L and may additionally have a further fan L and/or a throttle flap D (illustrated by dashed lines). In one embodiment of the invention, the control device S acts on the fan L which in the figure is connected to the control device S by a solid arrow line. The control device S can decrease a rotational speed of the fan L in order to reduce the cooling air mass flow, such that the fraction of the traction power of the vehicle allotted to the conveying of the cooling air mass flow decreases. Alternatively, it is also possible for the fan L to have blades which are adjustable in terms of their angle of incidence and for the control device S to act, in order to adjust the cooling air mass flow, on the angle of incidence of the blades. For the regulation of the cooling air mass flow, the present value of the cooling air mass flow is signaled to the control device S.

A further possibility for the control of the cooling air mass flow is the action on the throttle flap D, which in the figure is connected to the control device S by a dashed arrow line. In this case, a rotational speed of the fan L may be included, while the cooling air mass flow is determined by a degree of opening of the throttle flap D.

A further possibility for the control of the cooling air mass flow consists, in the illustrated exemplary embodiment, in the control device S acting on both of the fans L illustrated such that one of the two fans L is deactivated if the then resulting lower cooling air mass flow ensures that a maximum admissible temperature of the component K is not attained.

For the control of the cooling air mass flow, a plurality of input values for the following variables are supplied to the control device S: traveling speed, power consumption of the component K, thermal loading of the component K, power consumption of the one or more fans L, intensity of the cooling air mass flow, rotational speed of the one or more fans L, and traction power of the vehicle. If it is ensured that the maximum admissible thermal loading of the component K will not be exceeded, one or more of the abovementioned variables may be dispensed with. In the ideal situation, the control device S minimizes the power consumption of the rail vehicle at all traveling speeds thereof. In the exemplary embodiment which provides a plurality of fans L, a number of activated or deactivated fans L may additionally be signaled to the control device S. For example, in the illustrated exemplary embodiment, if only one of the two fans L is in operation but the temperature of the component K is approaching the inadmissible temperature range, the control device S will activate the second fan L.

In exemplary embodiments of the invention in which information regarding the traveling speed of the vehicle is transmitted to the control device S, the control device S is designed such that, in the high speed range, a reduction of the cooling air mass flow is performed, because it is specifically in this speed range that the power savings are at their greatest. By contrast, below a predetermined driving speed, the cooling air mass flow may assume its nominal value.

The component K of the vehicle may be basically any component which is to be cooled in some way. Examples include: an air conditioning system, which includes a heat exchanger, for example a condenser or a heat extractor, as a cooler, and a converter or transformer, which is an electrical device of the vehicle and which is typically equipped with a cooling structure as a cooler. It is evident that the arrangement illustrated in the figure may be expanded to include further components of the vehicle, wherein then the control device S would have to take into consideration the thermal load capacity of the further components.

Figure 2:
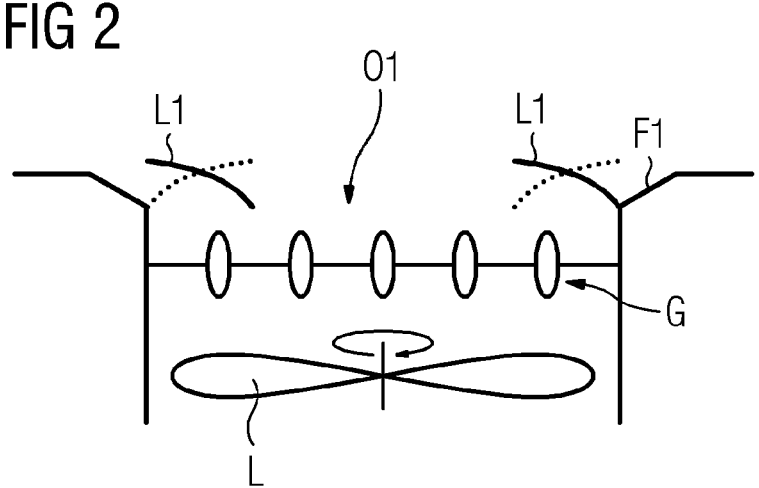
FIG. 2 shows a longitudinal sectional view of a roof opening of the rail vehicle.

FIG. 2 shows a first embodiment of a roof opening O1 which acts as an intake or outlet opening. Guide flaps L1 which are provided and which are arranged in each case on the edge of the opening O1, one behind the other in the longitudinal direction of the rail vehicle, can be pivoted about an axis which runs transversely in relation to the rail vehicle, such that the opening can be adapted in terms of its function to the direction of travel of the rail vehicle. The guide flaps L1 can move within a vehicle contour because they are installed in a recessed and space-saving manner. A bevel F1 provided on the edge of the opening O1 may for example amount to 30°. For the guide flaps L1, neutral and intermediate positions are possible in order to permit an optimum adaptation to a present cooling air demand and to the air resistance. The guide flap position illustrated in FIG. 2 by solid lines corresponds to an outlet for a direction of travel towards the right and corresponds to an inlet for a direction of travel towards the left. By contrast, the dashed line represents an outlet action for a direction of travel towards the left and an inlet action for a direction of travel towards the right. The guide flaps L1 are in each case parallel to one another.

When the vehicle is at a standstill, the left-hand guide flap L1 in FIG. 2 is arranged corresponding to the solid line, and the right-hand air flap L1 is arranged corresponding to the dashed line.

In an extended exemplary embodiment, further guide flaps are provided between the two guide flaps L1 illustrated, such that a closure of the opening O1 is also possible, for example. When such a number of guide flaps L is provided, it is possible if appropriate to dispense with the provision of a guide grate G (illustrated in FIG. 2), which likewise has the task of conducting the cooling air flow in an expedient manner, in the opening region.

Figure 3:
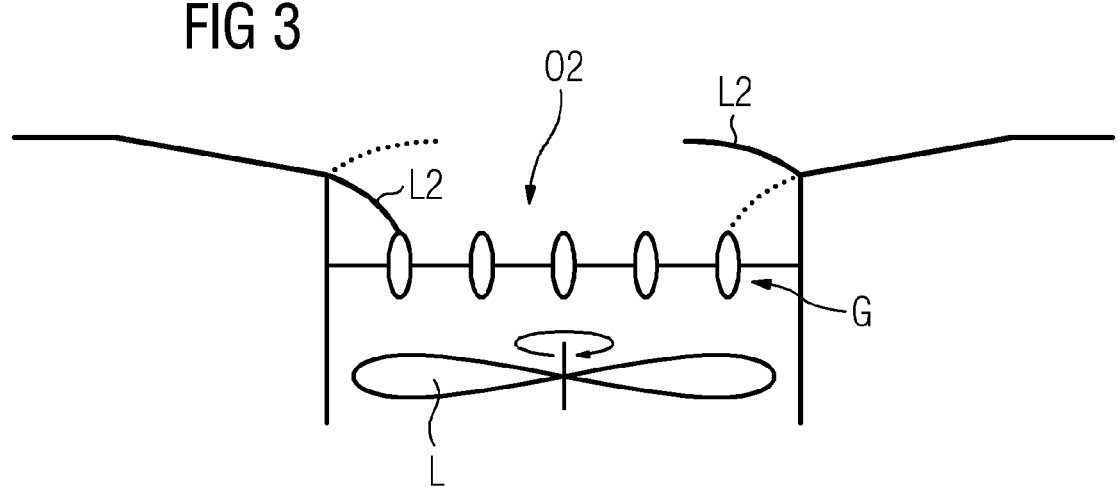
FIG. 3 shows a longitudinal sectional view of an alternatively designed roof opening of the rail vehicle.

In the exemplary embodiment for a configuration of a roof opening O2 of the rail vehicle as illustrated in FIG. 3, it is likewise the case that two guide plates L2 are provided in the edge region of the roof opening O2 in each case along the rail vehicle. Whereas it is the case in the exemplary embodiment of FIG. 2 that the pivot axes for the guide flaps L are situated slightly inward from the edge of the opening O1, the pivot axes for the guide flaps L2 are situated directly at the inner edge of the roof opening O2. The guide flaps L2 may also, depending on a respective direction of travel, be adjusted such that the roof opening O2 serves as an intake opening or outlet opening as required.

In both exemplary embodiments for the configuration of a roof opening according to FIGS. 2 and 3, the guide flaps L1, L2 have, in the direction of the inlet opening O1, O2, a curved contour or a contour which is faceted at small angles. At the discharge side, there is formed a protruding contour in which the guide grate G is enclosed, or if the installation space does not permit this, an initially slightly inwardly drawn contour which follows the projecting contour and which is symmetrical in both directions of travel or which can be adjusted according to the direction of travel.

The invention claimed is:

1. A vehicle having at least one component to be cooled, the vehicle comprising:
    at least one conveying device for delivering to the at least one component a cooling air mass flow, the cooling air mass flow having a predetermined nominal value which, for an assumed maximum thermal loading of the at least one component, provides a cooling action adequate for the operation of the at least one component;
    a control device configured for controlling an intensity of the cooling air mass flow and for dimensioning the cooling air mass flow, taking into consideration thermal demands of the component at least in an upper traveling speed range of the vehicle, such that a sum total of a power consumption of the at least one component, of the at least one conveying device, and of a fraction of a traction power of the vehicle allotted to conveying the cooling air mass flow is lower than a sum total of the power consumption of the at least one component, of the at least one conveying device and of a fraction of a traction power of the vehicle allotted to the conveying of the cooling air mass flow with its predetermined nominal value;

said control device configured such that the cooling air mass flow assumes the predetermined nominal value below a predetermined traveling speed of the vehicle.

2. The vehicle according to claim 1, wherein said at least one conveying device is a fan and said control device is configured to control a rotational speed of said fan.

3. The vehicle according to claim 2, wherein said conveying device includes a plurality of fans and said control device is configured to selectively activate or deactivate at least one of said fans as required.

4. The vehicle according to claim 1, wherein said at least one conveying device is a fan having blades with an adjustable angle of incidence and said control device is configured to adjust the cooling air mass flow by varying the angle of incidence of said blades.

5. The vehicle according to claim 1, which comprises a throttle flap disposed in a flow path for the cooling air mass flow, and wherein said control device is configured to act on said throttle flap for adjusting the cooling air mass flow.

6. The vehicle according to claim 1, wherein the at least one component to be cooled is a plurality of components to be cooled.

7. The vehicle according to claim 1, wherein said control device is configured to receive at least one operating variable of the vehicle selected from the group consisting of a traveling speed, a power consumption of the at least one component, a thermal loading of the at least one component, a power consumption of the at least one conveying device, an intensity of the cooling air mass flow, a rotational speed of a fan being the at least one conveying device, and a traction power of the vehicle.

8. The vehicle according to claim 1, wherein said conveying device includes a plurality of fans and said control device is configured to receive signals indicating a number of activated or deactivated fans.

9. The vehicle according to claim 1, wherein said control device is configured such that, taking into consideration thermal demands of the at least one component, the sum total of the power consumption of the at least one component, of the at least one conveying device and of the fraction of the traction power of the vehicle allotted to the conveying of the cooling air mass flow is minimized.

10. The vehicle according to claim 1, wherein the control device is configured to set the cooling air mass flow to the predetermined nominal value when a traveling speed of the vehicle lies below a predetermined traveling speed.

11. The vehicle according to claim 1, wherein the at least one component is an air-conditioning system having a condenser as a cooler.

12. The vehicle according to claim 1, wherein the at least one component to be cooled is an electrical device of the vehicle, the electrical device having at least one cooling structure as a cooler.

13. The vehicle according to claim 12, wherein the electrical device is a converter or a transformer.

14. The vehicle according to claim 1, wherein said control device is configured to receive current measurement values for the cooling air mass flow or for a variable representing the cooling air mass flow, and said control device utilizes the current measurement values for closed-loop control.

15. The vehicle according to claim 1, which comprises aerodynamic elements configured to assist a conveying of the cooling air mass flow disposed at an intake opening and/or a discharge opening for the cooling air mass flow.

16. The vehicle according to claim 15, wherein said aerodynamic elements are guide flaps mounted one behind another in a longitudinal direction of the vehicle.

17. The vehicle according to claim 16, wherein said guide flaps are pivotally mounted about a transverse axis of the vehicle.

18. The vehicle according to claim 15, which comprises a guide grate for the cooling air mass flow disposed at one or both of the intake opening or the discharge opening for the cooling air mass flow.

19. A method of operating a vehicle having at least one air-cooled component and at least one conveying device for conveying a cooling air mass flow for cooling the at least one component, the method which comprises:

predetermining a nominal value for a cooling air mass flow sufficient for cooling the at least one component during an assumed maximal thermal load;

controlling an intensity of the cooling air mass flow and thereby dimensioning the cooling air mass flow, taking into consideration thermal demands of the at least one component at least in an upper traveling speed range, such that a sum total of a power consumption of the at least one component, of the at least one conveying device, and of a fraction of a traction power of the vehicle allotted to conveying the cooling air mass flow is lower than a sum total of the power consumption of the at least one component, of the at least one conveying device, and of the fraction of a traction power of the vehicle allotted to the conveying of the cooling air mass flow at the predetermined nominal value, wherein the cooling air mass flow assumes the predetermined nominal value below a predetermined traveling speed of the vehicle.

20. The method according to claim 19, wherein the conveying device includes a fan and the controlling step comprises adjusting the cooling air mass flow by controlling a rotational speed of the fan.

21. The method according to claim 20, wherein the fan is one of a plurality of fans and the controlling step comprises selectively activating and deactivating at least one of the fans as required.

22. The method according to claim 20, wherein the controlling step comprises adjusting an angle of incidence of blades of the fan for adjusting the cooling air mass flow.

23. The method according to claim 19, wherein a throttle flap is disposed in the flow path for the cooling air mass flow, and the controlling step comprises controlling the throttle flap for the adjustment of the cooling air mass flow.

24. The method according to claim 19, wherein a plurality of components to be cooled are provided.

25. The method according to claim 19, which comprises acquiring at least one operating variable of the vehicle selected from the group consisting of a traveling speed, a power consumption of the at least one component, a thermal loading of the at least one component, a power consumption of the at least one conveying device, an intensity of the cooling air mass flow, a rotational speed of the at least one conveying device and a traction power of the vehicle; and controlling the intensity of the cooling air mass flow on the basis of a measurement value for at least one of the operating variable of the vehicle.

26. The method according to claim 21, wherein the at least one conveying device is a plurality of fans and the step of controlling the cooling air mass flow includes signaling a number of respectively activated or deactivated fans.

27. The method according to claim 19, which comprises controlling the cooling air mass flow such that, taking into consideration thermal demands of the at least one component, the sum total of the power consumption of the at least one component, of the at least one conveying device and of the fraction of the traction power of the vehicle allotted to the conveying of the cooling air mass flow is minimized.

28. The method according to claim 19, which comprises adjusting the cooling air mass flow to assume the predetermined nominal value at a traveling speed of the vehicle below a given threshold speed.

29. A vehicle having at least one component to be cooled, the vehicle comprising:
- at least one conveying device for delivering to the at least one component a cooling air mass flow, the cooling air mass flow having a predetermined nominal value which, for an assumed maximum thermal loading of the at least one component, provides a cooling action adequate for the operation of the at least one component;
- a control device configured for controlling an intensity of the cooling air mass flow and for dimensioning the cooling air mass flow, taking into consideration thermal demands of the component, such that the cooling air mass flow is reduced due to the vehicle traveling in an upper traveling speed range of the vehicle in comparison to the cooling air mass flow in a lower traveling speed range of the vehicle.

* * * * *